United States Patent [19]
Tai et al.

[11] Patent Number: 5,786,903
[45] Date of Patent: Jul. 28, 1998

[54] MULTI-POWER CONTROL SYSTEM FOR SCANNERS

[75] Inventors: Tsao-Chin Gene Tai; Ming-Sung Huang, both of Hsin-Chu, Taiwan

[73] Assignee: Must Systems Inc., Hsinchu, Taiwan

[21] Appl. No.: 636,437

[22] Filed: Apr. 23, 1996

[51] Int. Cl.⁶ .................... H04N 1/04; H05B 39/100; H01J 7/44; G06F 9/45
[52] U.S. Cl. .................... 358/485; 358/485; 358/776; 358/805; 358/806; 315/98; 315/48; 395/750.02; 395/750.06; 313/591
[58] Field of Search .................... 348/776, 805, 348/806, 485; 315/98, 48; 313/591; 345/10–29

[56] References Cited

U.S. PATENT DOCUMENTS 5,630,144 5/1997 Woog et al. .................... 395/750
5,648,799 7/1997 Kikinis et al. .................... 345/212

*Primary Examiner*—Edward L. Coles
*Assistant Examiner*—Twyler Lamb
*Attorney, Agent, or Firm*—Pennie & Edmonds LLP

[57] ABSTRACT

The present invention discloses a multi-power control system for scanners. The method of the present invention has a mode of warm up time, which is controlled by a software that is embeded in a computer. Users can choose a mode of warm up time to control the warm up duration when a cathode ray tube needs. After scanning, users can determine whether the scanner is to operate or in standby status. When the user chooses the latter, the luminosity of the cathode ray tube is according to the user's pre-set. This multi-power control system not only can reduce the warm up time but also can be in harmony with the concept of enviromental protection.

16 Claims, 4 Drawing Sheets

| digital control signal | control voltage | warm up time |
|---|---|---|
| 111 | 12 V | 0 sec |
| 110 | 10 V | 5 sec |
| 101 | 8 V | 10 sec |
| 100 | 6 V | 20 sec |
| 001 | 5 V | 60 sec |
| 000 | 0 V | 180 sec |

MULTI-POWER CONTROL SYSTEM FOR SCANNERS

FIELD OF THE INVENTION

The present invention relates to a method of power control system for scanners, and more specifically, to a multi-power control system for scanners.

BACKGROUND OF THE INVENTION

A cathode ray tube is greatly utilized in an optic scanner. Generally speaking, the cathode ray tube can normally be operated after it is warmed up. That is because the cathode ray tube can not be operated until the cathode ray tube becomes stable. If the scanner is used when the cathode ray tube is unstable, the document scanned is abnormal.

FIG. 1 illustrates a typical method in the prior art. First, in step 101 the power of the optic scanner is on, and the cathode ray tube is in step 102, that is in warm up status. Generally speaking, the cathode ray tube will become stable after a few minutes of warm up status. After that in step 103, a document is scanned by using the scanner. Step 104 determines whether the scanner is to be operated or not. The 'YES' branch is selected in the step 106, the power of the scanner will be shut down. While, the branch 'NO' is selected in step 105 and the cathode ray tube is kept on and in standby status. In addition, the concept of protecting the enviroment such as the green function of the computer is recently raised. In the standby status however, the cathode ray tube is kept on which is not in harmony with the concept of enviromental protection.

In order to be in accordance with the concept of enviromental protection, another method of operation is illustrated in FIG. 2. Similarily, in step 201 the power of the optic scanner is on, and the cathode ray tube is in warm up status in step 202. Normally, the cathode ray tube will be stable after the process of warm up. After that in step 203, a document is scanned by using the scanner. Step 204 determines whether the scanner is still being operated or not. The 'YES' branch is selected in step 206, the power of the scanner will be shut down. On the contrary, the branch 'NO' is selected in step 205 and the cathode ray tube is turn off and in the status of standby. Although the method of the prior art is in line with the concept of enviromental protection but it is not convenient for users, that is because before the scanner can be normally operated, the users have to warm up the cathode ray tube, which takes a few minutes.

There are some disadvantages associated with the prior art described above:
(1) The method of prior art is not in line with the concept of enviromental protection and the prior art method will shorten the life time of the cathode ray tube caused in the standby status, the power of the cathode ray tube is not turn off.
(2) The method of prior art is not convenient for the users and the method will reduce the work efficiency.

SUMMARY OF THE INVENTION

It is an object of the present invention to provide a method of multi-power control system for scanners.

The method of the present invention includes choosing a mode of warm up time; executing a standby status; executing a warm up status; and executing a scanning status. The mode of warm up time is controled by a software that is embeded in the computer. Users can choose a mode of warm up time depending on what they need. Then the cathode ray tube of the scanner is in warm up status. Consequently that a document is scanned by using the scanner. The users determine whether the scanner is still operated or not. If the users do not want to operate the scanner, the power of the scanner will be shut down. On the contrary, the luminosity of the cathode ray tube is set up according to the mode pre-set by the user.

The multi-power control system for the scanner of the present invention includes a signal controller, a warm up power generater, and a cathode ray tube. The signal controller is a digital signal to analog signal converter (D/A converter). The warm up power generater includes a operatational amplifier, a darlington transistor, and a AC to DC inverter. A control voltage will be generated by the warm up power generater. The warm up voltage is used to control the warm up duration that the cathode ray tube needs.

Some advantages associated with the present invention are described as follows:
(1) The method of the present invention is in line with the concept of enviromental protection.
(2) The method of the present invention is convenient for the users to control the warm up time of the cathode ray tube.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 6 is a table of digital signal verus warm up time.

DETAILED DESCRIPTION OF THE PREFERRED EMBODIMENT

Figure 1:
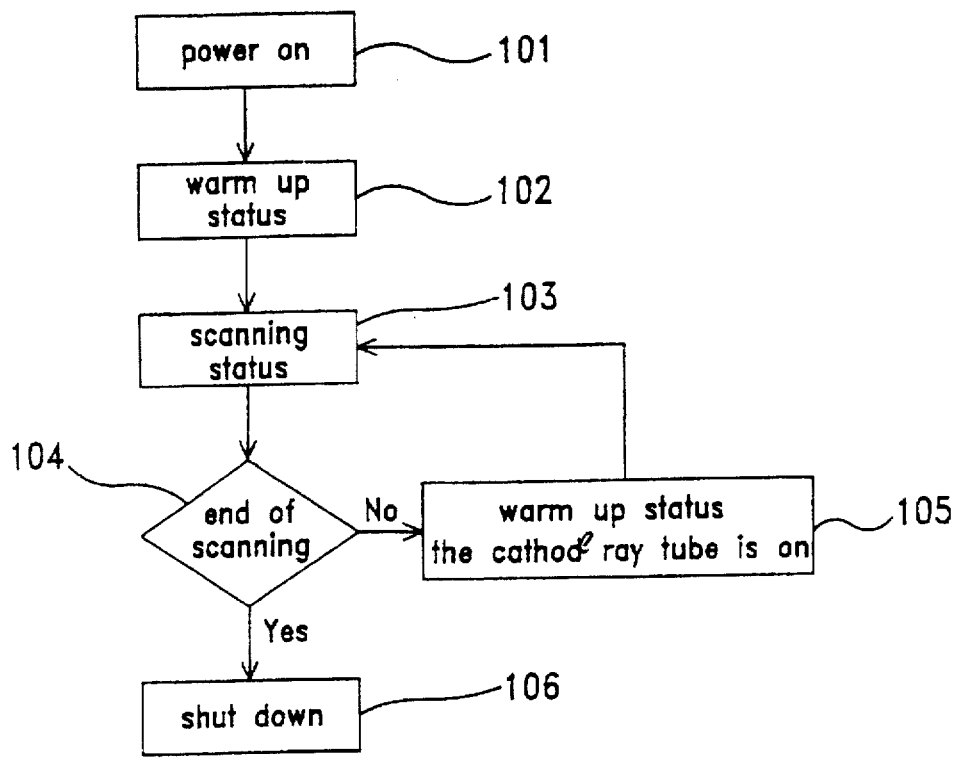
FIG. 1 is a flow diagram of a typical method in the prior art.
Figure 2:
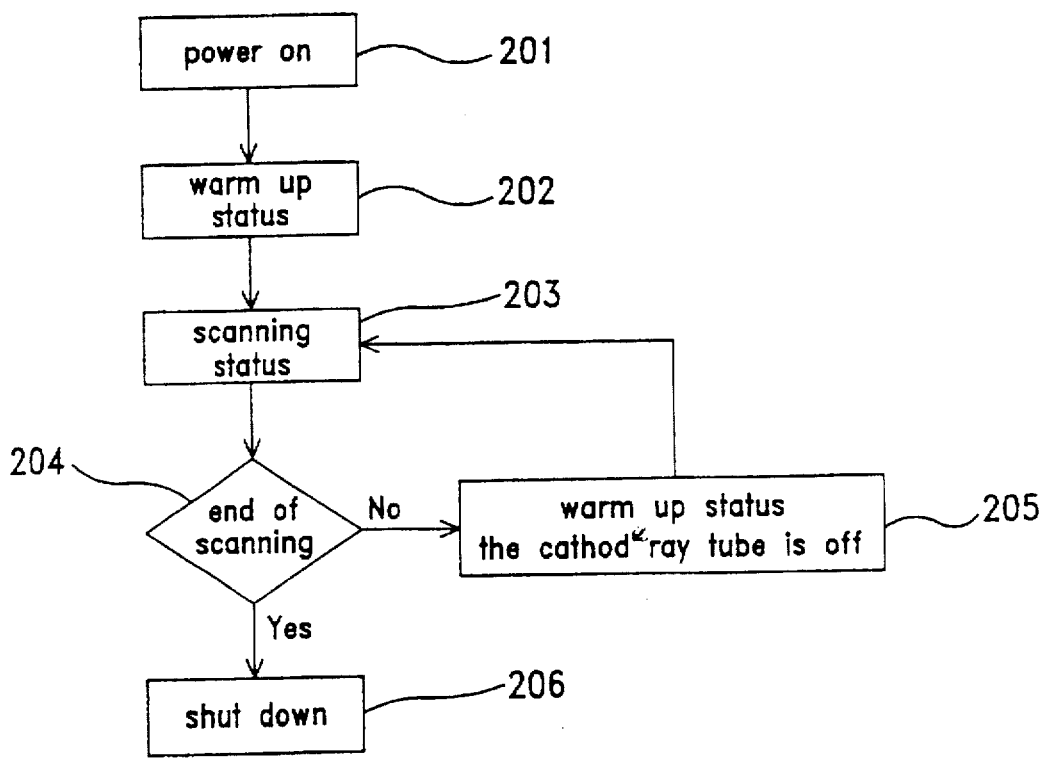
FIG. 2 is an another flow diagram of a typical method in the prior art.
Figures 3, 4:
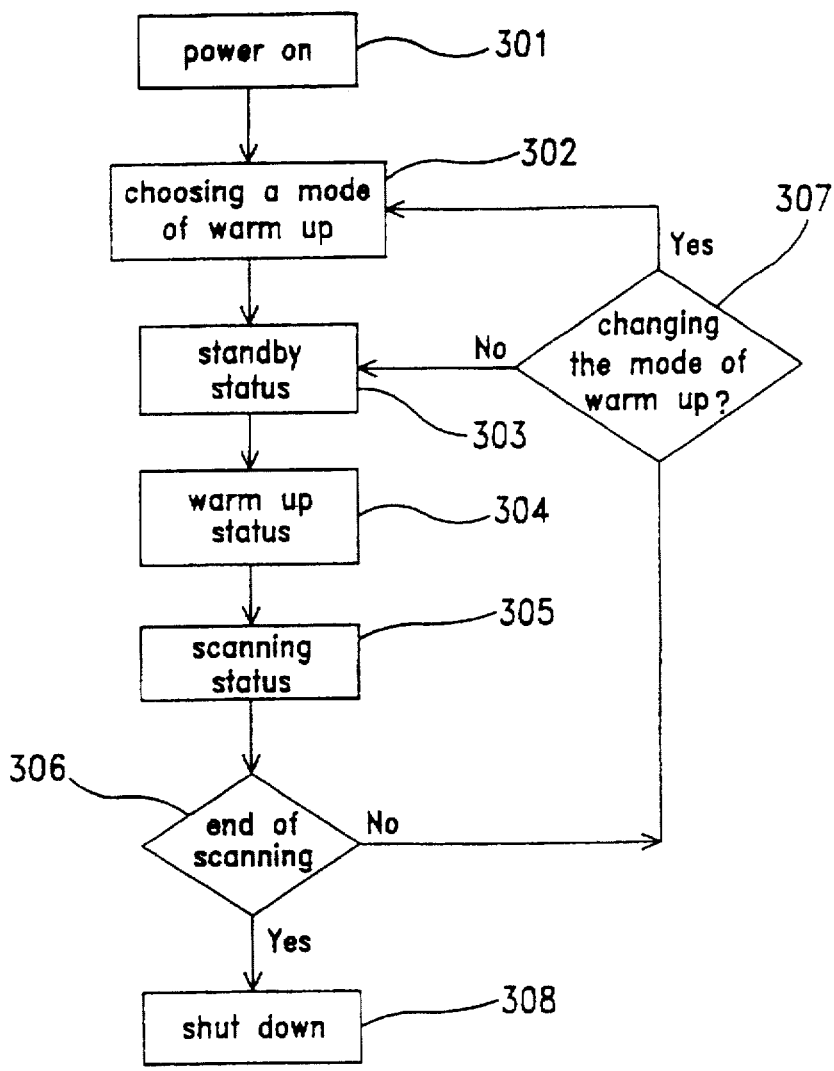
FIG. 3 is a flow diagram of a method in the present invention.
FIG. 4 is a table of warm up mode of the present invention.

FIG. 3 illustrates a method of a multi-power control system for the scanner of the present invention. In step 301, the power of the optic scanner is turned on, and the cathode ray tube is in step 302, that is in the status of choosing a mode of warm up time shown as in FIG. 4. The mode of warm up time used is to determine how much time a cathode ray tube need to be warmed up. The mode of warm up time is controled by a software that is embeded in a computer. Users can choose a mode of warm up time depending on what the users need. For example, if a user has to leave for a while, the user can choose a save power mode before he leaves. When the user comes back, it takes only 180 seconds to warm up the cathode ray tube of the scanner. If the user chooses a quick scanning mode, then it takes only 5 seconds to warm up the cathode ray tube of the scanner. Next, in step 303, cathode ray tube of the scanner is in standby status, which is used to make the luminosity of the cathode ray tube to comply with the mode of warm up time. Then in step 304, the cathode ray tube of the scanner is in warm up status, which is to increase the luminosity to normal status. General speaking, it takes a few minutes to complete the procedure.

In step 305, a document is scanned by the scanner. Step 306, to determine whether the scanner is being operated or not. When the 'YES' branch is selected in the step 308, the power of the scanner will be shut down. On the contrary, the branch 'NO' is selected in step 307 and the cathode ray tube is kept on according to the mode that the user sets up. In step 307, the user can also change the mode of warm up duration if he wants.

Figure 5:
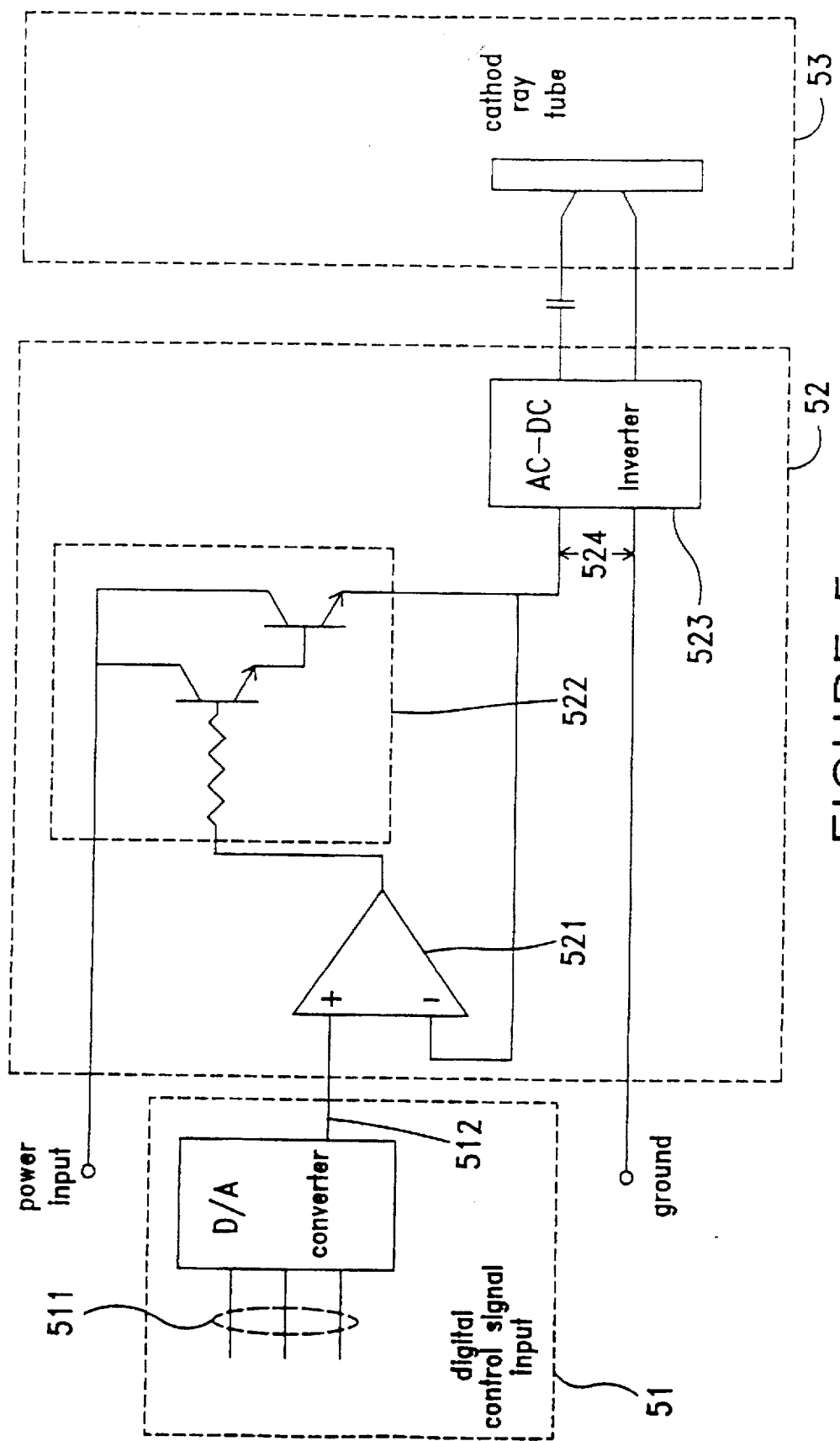
FIG. 5 is a functional block diagram of the present invention.

FIG. 5 shows the functional block of the present invention. The multi-power control system for the scanner includes a signal controller 51, a warm up power generater 52, and a cathode ray tube 53. The signal controller is a digital signal to analog signal converter (D/A converter) 51. An analogue signal is input in the port 511 of the D/A converter 51, then a voltage is output from the port 512 of the D/A converter 51. Subsequently, the output voltage of the D/A converter is input to the warm up power generater 52. The warm up power generater 52 includes a operational amplifier 521, a darlington transistor 522, and a AC to DC inventer (alternate current to direct current inventer) 523. The output voltage of the D/A converter will be input to one of the ports of the operational amplifier 521. A control voltage 524 will be generated by the warm up power generater 52. Therefore the warm up power generater 52 control the time of warm up according to the warm up voltage. The control voltage 524 is used to control the warm up time that the cathode ray tube is need. The relationship of the digital signal, the control voltage of warm up power generater and warm up time is illustrated in FIG. 6. The digital signal and the control voltage are corresponding to a mode of warm up time. For example, the digital signal (111) is input to D/A converter, then the output voltage of warm up power generater is 12 voltage, the warm up time is 0 second. The digital signal (000) is input to D/A converter, then the output voltage of warm up power generater is 0 voltage, the warm up time is 180 seconds. The cathode ray tube is input the control voltage to control the luminosity of the cathode ray tube in order to control the warm up time of the cathode ray tub. Utilizing the multi-power control system not only can save the warm up time but also can contribute to the concept of enviromental protection.

As is understood by a person skilled in the art, the foregoing preferred embodiment of the present invention is illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A method of a multi-power control system for a optic scanner, said method comprising:

choosing a mode of warm up time to determine how much time a cathode ray tube needs to be warmed up;

executing a standby status to make the luminosity of said cathode ray tube corresponding to said mode of warm up time;

executing a warm up status to increase said luminosity to normal status; and executing a scanning status to scan a document.

2. The method of claim 1, further comprising:

shutting down the power of said system, when detecting said scanning is ended.

3. The method of claim 2, further comprising:

executing said standby status to make luminosity of said cathode ray tube according to said mode of warm up time, when detecting said scanning is not ended.

4. The method of claim 1, further comprising utilizing a digital signal corresponding with a control voltage to control said warm up time of said cathode ray tube.

5. The method of claim 4, wherein said warm up times are 0 second, 5 seconds, 10 seconds, 20 seconds, 60 seconds, and 180 seconds.

6. The method of claim 5, wherein said control voltages are 12V, 10V, 8V, 6V, 5V, and 0V.

7. A multi-power control system for optic scanner, comprising:

signal controlling means responsive to a digital control signals for generating a control voltage; and said signal controlling means representing a mode of warm up time warm up power generating means responsive to said control voltage of said multi-power signal controlling means for genereteing a warm up voltage; and cathode ray tube means responsive to said warm up voltage serving as a source of said scanner, and according to said warmup voltage to control the luminosity of said cathode ray tube.

8. The system of claim 7, wherein said signal controller is a digital/analouge converter.

9. The system of claim 7, wherein said warm up times are 0 second, 5 seconds, 10 seconds, 20 seconds, 60 seconds, and 180 seconds.

10. The system of claim 9, wherein said control voltages are 12V, 10V, 8V, 6V, 5V, and 0V.

11. The system of said claim 7, wherein said warm up power generater comprising:

a operational amplifier;

a darlington transistor; and a AC to DC inverter (alternate current to direct current inverter).

12. A method of controlling a power system for an optical scanner, said method comprising the steps of:

selecting a warm up mode corresponding to a warm-up time for which the scanner's cathode ray tube must be warmed up before a scan;

entering a standby mode until the luminosity of the cathode ray tube corresponds to a selected warm-up time;

warming up the scanners to increase the luminosity of the cathode ray tube to a normal level; and scanning a document.

13. The method of claim 12 comprising the additional step of shutting off the scanner upon completion of a scan.

14. The method of claim 12 comprising the additional step of selecting another warm-up mode upon completion of a scan.

15. The method of claim 14 comprising the additional step of returning to standby mode upon selecting another warm-up mode.

16. The method of claim 12 wherein a digital signal corresponding to a predetermined control voltage controls said specified warm-up time.

* * * * *